L. GRISCOM.

STUB END FOR CONNECTING RODS.

No. 10,668. Reissued Dec. 1. 1885.

Witnesses:
William F. Davis
James F. Tobin.

Inventor:
Lewis Griscom
by his Attorneys
Howson & Sons

UNITED STATES PATENT OFFICE.

LEWIS GRISCOM, OF POTTSVILLE, PENNSYLVANIA.

STUB END FOR CONNECTING-RODS.

SPECIFICATION forming part of Reissued Letters Patent No. 10,668, dated December 1, 1885.

Original No. 328,885, dated October 20, 1885. Application for reissue filed November 2, 1885. Serial No. 181,706.

*To all whom it may concern:*

Be it known that I, LEWIS GRISCOM, a citizen of the United States, residing at Pottsville, in the State of Pennsylvania, have invented certain new and useful Improvements in Stub Ends for Connecting-Rods, of which the following is a description.

My invention relates to the construction of journal-bearings of various kinds, in which the brasses are held in place by straps, bolts, or similar devices; and the object of my invention is to so construct the bearings that the latter will not bind on the journals when they become heated.

My invention is especially applicable to the stub ends of connecting-rods of steam and other engines and machines where the bearings, are liable to heat and bind on the crank-pins, these latter constituting the journals.

Figure 1:
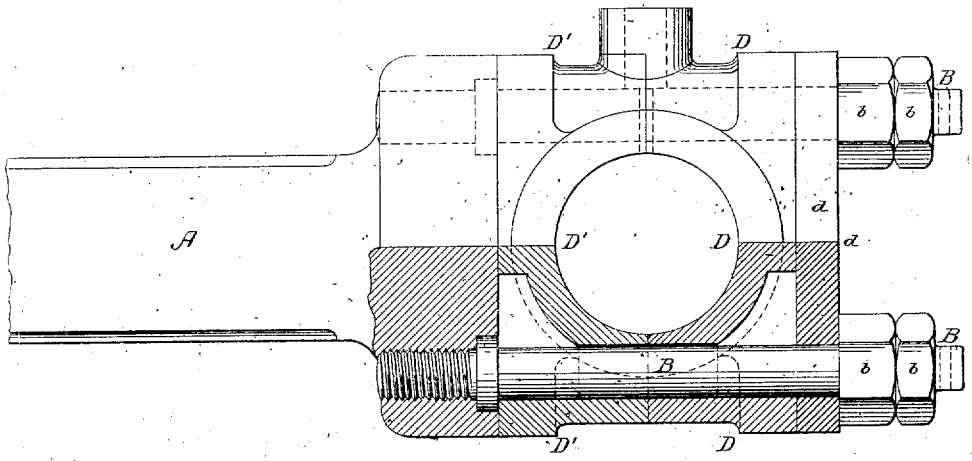
Figure 2:
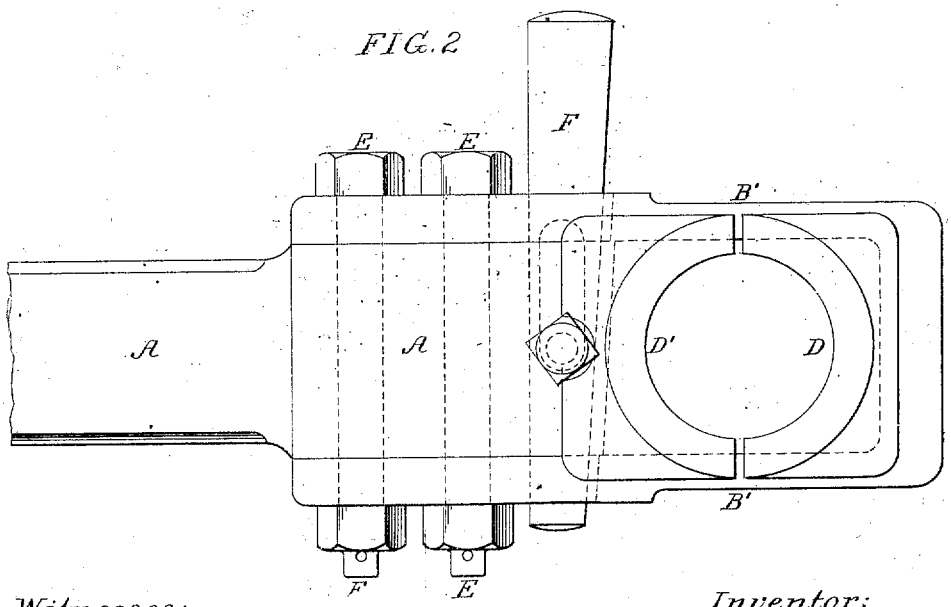

In the accompanying drawings, Figure 1 is a side view, partly in section, of one form of stub end embodying my invention, and Fig. 2 is a side view of another form.

In the construction shown in Fig. 1, A is the connecting-rod, into the end of which are screwed, or otherwise secured, bolts B B, provided at their outer ends with nuts *b b*, between which and the end of the rod are confined the two bearing-blocks or half-bearings D D′ and retaining cross-plate *d d*.

In the construction shown in Fig. 2, the two bearing-blocks or half-bearings D D′ are held in place by the strap B′, which is secured to the end of the connecting-rod by suitable bolts and nuts, E E, and a setting-up wedge, F. In the ordinary construction of these stub ends or bearings the bearing-blocks D D′ are of brass and the confining bolts or straps of iron or steel. When the crank-pin or other journal begins to heat, and consequently increase in diameter, the bearing-brasses become heated also, and must necessarily expand, but being confined by the bolts or straps of iron or steel, which metals have a less ratio of expansion than the brass, the bearing-blocks cannot expand outwardly by stretching the iron or steel straps or bolts, and must therefore expand inwardly. The brasses thus tend to bind on the crank-pin or other journal and increase the difficulty caused by the heating from lack of oil or other cause, in some cases resulting in the direct stoppage of the engine or other machine. To remedy this difficulty, I construct the bolts or straps which confine or retain the bearing-blocks of a metal which has the same ratio of expansion as the bearing-blocks themselves, and a greater rate of expansion under heat than the crank-pin or other journal; and for this purpose I make use of phosphor-bronze, which has sufficient tensile strength to stand the strain, though any other alloy or metal having the same properties can be used instead of phosphor-bronze. With this construction, when from any cause the crank-pin or other journal and its bearings begin to heat and expand, the heat communicated to the retaining bolts or straps will cause the latter to expand also and at a greater rate than the pin or journal, thus relieving the bearing just when needed, so that when the pin or journal becomes heated the engine or machine will continue running and will give opportunity to the bearings to cool down without stopping.

I claim as my invention—

A stub end or other bearing having bearing-blocks and provided with confining bolts or straps of a metal having a greater rate of expansion than the crank-pin or other journal, substantially as described.

In testimony whereof I have hereunto set my hand in the presence of two subscribing witnesses.

LEWIS GRISCOM.

Witnesses:
JNO. P. GRISCOM,
MASON FRICK.